United States Patent [19]

Yoshioka et al.

[11] Patent Number: 5,469,818
[45] Date of Patent: Nov. 28, 1995

[54] VARIABLE VALVE TIMING CONTROL DEVICE FOR AN ENGINE

[75] Inventors: Mamoru Yoshioka, Susono; Haruyuki Obata, Toyota; Ken Tanoue, Okazaki; Yoshihiro Iwashita, Shizuoka; Toshimi Kashiwagura, Susono; Makoto Suzuki, Mishima; Hiroki Ichinose, Fujinomiya; Hironori Okamizu, Shizuoka, all of Japan

[73] Assignee: Toyota Jidosha Kabushiki Kaisha, Toyota, Japan

[21] Appl. No.: 403,093

[22] Filed: Mar. 13, 1995

[30] Foreign Application Priority Data

Mar. 15, 1994 [JP] Japan ..................... 6-044178

[51] Int. Cl.⁶ ............... F01L 1/34; F01L 13/00
[52] U.S. Cl. .................. 123/90.15; 123/90.31; 123/90.17
[58] Field of Search ............... 123/90.15, 90.16, 123/90.17, 90.31

[56] References Cited

U.S. PATENT DOCUMENTS

| | | | |
|---|---|---|---|
| 5,271,360 | 12/1993 | Kano et al. | 123/90.17 |
| 5,333,577 | 8/1994 | Shinojima | 123/90.17 |
| 5,363,817 | 11/1994 | Ikeda et al. | 123/90.17 |
| 5,400,747 | 3/1995 | Tabata et al. | 123/90.17 |

FOREIGN PATENT DOCUMENTS 60-190610  9/1985  Japan.
3-99806   10/1991  Japan.

*Primary Examiner*—Henry C. Yuen
*Assistant Examiner*—Weilun Lo
*Attorney, Agent, or Firm*—Kenyon & Kenyon

[57] ABSTRACT

The variable valve timing control device according to the present invention controls the valve timing of the intake valves of the engine based on the optimum valve timing at the full load operation of the engine. Namely, the variable valve timing control device of the present invention determines the valve timing in accordance with the combination of the present engine load and the present engine speed in such a manner that the deviation of the valve timing from the optimum valve timing when the engine is operated in full load at the present speed does not exceed a predetermined maximum allowable value. Since the valve timing of the engine is always set within a range determined by the maximum allowable deviation from the optimum valve timing for the full load operation, when the engine is accelerated to the full load condition the amount of the change, i.e., the amount of the operation of the variable valve timing control device is kept always within the range determined by the maximum allowable deviation. Therefore, the time required for changing the valve timing to the optimum valve timing for the full load operation is always short regardless of the present operating condition of the engine. Consequently, the response of the valve timing control can be improved without increasing the operating speed of the variable valve timing control device.

9 Claims, 8 Drawing Sheets

VARIABLE VALVE TIMING CONTROL DEVICE FOR AN ENGINE

BACKGROUND OF THE INVENTION

1. Field of the Invention

The present invention relates to a variable valve timing control device for an internal combustion engine which controls the valve timing of the engine in accordance with the operating condition thereof.

2. Description of the Related Art

A variable valve timing control device for controlling the valve timing, i.e., the timing of inlet valves and/or exhaust valves of an engine is commonly known. The variable valve timing control device is used for setting the valve timing in accordance with the operating conditions of the engine such as the engine speed and the engine load in order to improve the fuel consumption, the engine output and the exhaust emission of the engine.

In the variable valve timing control device, the maximum operating speed of the device for changing the valve timing sometimes limits the response of the engine during a transient between the operating conditions. For example, when the difference between the valve timing settings for a high load operation and for a low or medium load operation of the engine is large, the variable valve timing control device must change the valve timing by a large amount when the engine load is increased from a low or medium load to a high load rapidly (such as, when the vehicle is accelerated). In this case, if the maximum operating speed of the variable valve timing control device is not sufficiently large, a relatively long time is required for the device to change the valve timing to new setting, i.e., the device cannot follow the speed of the change in the engine load. This causes a reduction in the output of the engine during the acceleration and thus a deterioration in acceleration of the vehicle.

Japanese Unexamined Patent Publication (Kokai) No. 60-190610 discloses one method for solving the problem caused by the delay in the response of the variable valve timing control device. The variable valve timing control device disclosed in JPP '610 sets a target value of the valve timing of the engine in accordance with the engine speed and the engine load, and generates a drive signal which has an intensity corresponding to the amount of the deviation of the actual valve timing from the target value of the valve timing. An actuator of the valve timing adjusting mechanism of the device in JPP '610 is driven by the drive signal generated by the variable valve timing control device. Therefore, the operating speed of the valve timing adjusting mechanism becomes higher as the intensity of the drive signal increases, i.e., as the deviation of the actual valve timing from the target value increases. Further, in JPP '610, the target value of the valve timing itself is increased by a predetermined amount during the acceleration of the vehicle. This causes the amount of the deviation of the actual valve timing from the target value to become larger during the acceleration of the engine than during the steady operation of the engine. Therefore, the operating speed of the variable valve timing control device of JPP '610 increases during the acceleration, and the response of the device in changing the valve timing during acceleration is improved.

However, the maximum operating speed of the valve timing adjusting mechanism is limited by the mechanical construction of the mechanism. Therefore, in the variable valve timing control device in JPP '610, it is not possible to obtain the operating speed of the valve timing adjusting mechanism larger than that limited by the mechanical construction of the mechanism even though the intensity of the drive signal is increased. Thus in the variable valve timing control device in JPP '610, though the intensity of the drive signal increases during the acceleration of the engine, the speed of change of the valve timing is limited. Therefore, when the amount of the change in the valve timing is large (such as during acceleration from a low or a medium load operation of the engine), a delay in changing the valve timing occurs during the acceleration of the engine.

In the device in JPP '610, it is possible to improve the response of the device by increasing the maximum operating speed of the valve timing adjusting mechanism. However, it is sometimes difficult to increase the operating speed of the valve timing adjusting mechanism from a practical point of view. For example, when a hydraulic actuator is used for driving the valve timing adjusting mechanism, the maximum operating speed of the mechanism is determined by the capacity of the hydraulic cylinder of the actuator and the maximum flow rate of the working fluid fed to the hydraulic cylinder. Therefore, in order to increase the maximum operating speed of the valve timing adjusting mechanism, the capacities of the hydraulic cylinder and the hydraulic supply system (such as a hydraulic pump, connecting piping and control valves) must be increased. Since this causes an increase in the size and the manufacturing cost of the whole system, it is difficult to increase the maximum operating speed of the valve timing adjusting mechanism. When a stepper motor is used as the actuator of the valve timing adjusting mechanism, same is true since the sizes of the motor and an electric supply system, such as a battery and an alternator, must be increased.

SUMMARY OF THE INVENTION

In view of the problems set forth above, the object of the present invention is to improve the response of the variable valve timing control device without increasing the size and manufacturing cost of the device.

The above object is achieved by the variable valve timing control device according to the present invention which comprises an engine speed detecting means for detecting the rotating speed of the engine, an engine load detecting means for detecting the load on the engine, an optimum full-load valve-timing calculating means for calculating an optimum valve timing of the engine when the engine is operated at a full load at the engine speed detected by the engine speed detecting means, a valve timing setting means for determining a setting value of the valve timing of the engine based on the engine speed detected by the engine speed detecting means and the engine load detected by the engine load detecting means in such a manner that the amount of deviation of the setting value of the valve timing from the optimum full load valve timing does not exceed a predetermined limiting value, and a valve timing adjusting means for adjusting the valve timing of the engine to the setting value determined by the valve timing setting means.

Usually, the valve timings of the respective operating condition are decided based on the optimum valve timing during a low speed and low load operation of the engine. Namely, the optimum valve timing during a low speed and low load operation is used as a reference valve timing, and the valve timings of the respective operating conditions are defined by an amount of deviation thereof from the optimum valve timing during a low speed and low load operation of the engine. Therefore, the valve timing during a low load operation and the valve timing during a high load operation sometimes differ by a large amount. Thus, it is required to change the valve timing by a large amount when the engine load changes from a low load to a high load. Since the maximum operating speed of the valve timing adjusting mechanism is limited, this causes a delay in changing the valve timing.

In one aspect of the present invention, the valve timing for the respective operating conditions (i.e., the combinations of the engine speed and the engine load) are determined based on the optimum valve timing for the full load operation at the respective engine speed. Namely, the optimum valve timings for the full load operations at the respective engine speeds are used as reference valve timings of the respective engine speeds. Further, the valve timings of the respective operating conditions are determined in such a manner that the amount of the deviations thereof from the reference valve timing do not exceed a predetermined value. Therefore, when the engine load is increased from a low load to a full load, the amount of the change in the valve timing, hence the amount of the operation of the valve timing adjusting mechanism, is always smaller than the predetermined amount. Since the maximum amount of the change in the valve timing is limited to an appropriate value, the time required for the valve timing adjusting mechanism to change the valve timing becomes shorter, i.e., the delay in the response for changing the valve timing can be minimized without increasing the maximum operating speed of the valve timing adjusting mechanism.

Further, according to another aspect of the invention, there is provided a variable valve timing control device comprising an engine speed detecting means for detecting a rotating speed of the engine, an engine load detecting means for detecting a load of the engine, an optimum full-load valve-timing calculating means for calculating an optimum valve timing of the engine when the engine is operated at a full load at the engine speed detected by the engine speed detecting means, a valve timing setting means for determining a setting value of the valve timing of the engine based on the present engine speed detected by the engine speed detecting means and the present engine load detected by the engine load detecting means in such a manner that the setting value becomes an optimum valve timing decided by the present engine speed and the present engine load, a correcting means for correcting the setting value of the valve timing in such a manner that the amount of deviation of the setting value of the valve timing from the optimum full load valve timing does not exceed a predetermined limiting value when the amount of the deviation becomes larger than the predetermined limiting value, and a valve timing adjusting means for adjusting the valve timing of the engine to the setting value after it is corrected by the correcting means.

In this aspect of the present invention, the amounts of the deviations of the valve timings of the respective operating conditions from the optimum valve timings of the full load operation at the respective engine speeds are always less than or equal to a predetermined value. Therefore, the delay in the response for changing the valve timing can be minimized without increasing the maximum operating speed of the valve timing adjusting mechanism.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENTS

Figure 1:
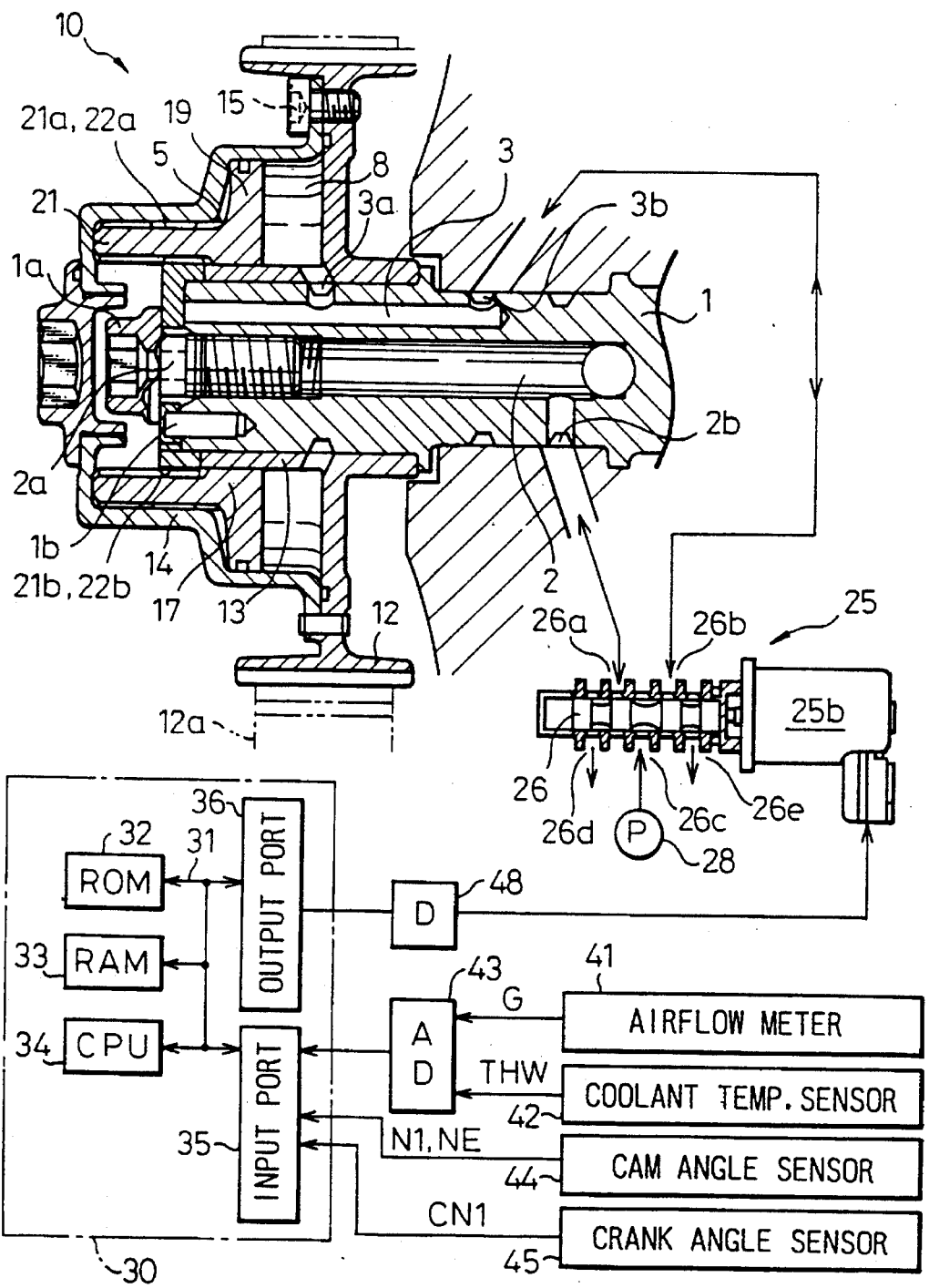
FIG. 1 is a sectional view illustrating the construction for an embodiment of the variable valve timing control device according to the present invention.

FIG. 1 shows an embodiment of the variable valve timing control device, according to the present invention, applied to inlet valves of a four-stroke internal combustion engine. In this embodiment, a double overhead camshaft (DOHC) engine having an intake camshaft and an exhaust camshaft for driving intake valves and exhaust valves of the engine, respectively, is used, and the variable valve timing control device is applied only to the intake camshaft. Namely, in this embodiment, the valve timing of the exhaust valves are fixed while the valve timing of the intake valves are changed in accordance with the operating conditions of the engine. However, the present invention is not limited to this embodiment. For example, the present invention can be also applied to the variable valve timing control device controlling the exhaust valves only, or both the intake and the exhaust valves.

In FIG. 1, numeral 1 designates an intake camshaft of a DOHC engine which drives intake valves of the respective cylinders. Numeral 10 indicates a valve timing adjusting mechanism attached to an end of the intake camshaft 1. The valve timing adjusting mechanism 10 comprises a timing pulley 12 having a cylindrical sleeve 13, and a housing 14 which covers the end portion of the intake camshaft 1. The timing pulley 12 is attached to the outer surface of the intake camshaft 1 by the sleeve 13 in such a manner that the pulley 12 can freely rotate around the camshaft 1. The housing 14 is secured to the timing pulley 12 by bolts 15 and rotate integrally with the pulley 12.

In the housing 14, a piston member 17 is disposed. The piston member 17 consists of an annular piston 19 and a cylindrical sleeve 21 extending from the annular piston 19 in coaxial manner. The annular piston 19 can slide axially on the camshaft 1 while maintaining close contact between its inner periphery and the outer surface of the camshaft 1, and between its outer periphery and the inner surface of the housing 14. On the outer surface of the cylindrical sleeve 21 of the piston member 17, an outer helical gear 21a having a predetermined tooth helix angle is formed. Similarly, an inner helical gear 21b having a predetermined tooth helix angle is formed on the inner surface of the cylindrical sleeve 21. The teeth of the outer helical gear 21a engage the teeth of an inner helical gear 22a formed on the inner surface of the housing 14. The teeth of the inner helical gear 21b engage the teeth of a ring-like outer helical gear 22b fixed to the end of the intake camshaft 1 by a bolt 1a and a pin 1b.

In this embodiment, the timing pulley 12 is driven by a crankshaft of the engine via a timing belt 12a and rotates synchronously with the crankshaft. When the timing pulley 12 rotates, the housing 14 rotates together with the pulley 12. The piston member 17, which is connected to the housing 14 through the engagement between the inner helical gear 22a of the housing 14 and the outer helical gear 21a of the sleeve 21, also rotates with the housing 14. Further, since the piston member 17 is connected to the intake camshaft 1 through the engagement between the inner helical gear 21b of the sleeve 21 and the ring-like outer helical gear 22b, the intake camshaft 1 rotates together with the piston member 17. Namely, the intake camshaft 1 is driven by the crankshaft of the engine through the timing belt 12a, the timing pulley 12, the housing 14, the helical gears 22a and 22b, the piston member 17, and the helical gears 21b and 22b, i.e., the intake camshaft 1 rotates synchronously with the crankshaft of the engine.

In this embodiment, the valve timing of the intake valves can be changed by sliding the piston member 17 of the valve timing adjusting mechanism 10 in the axial direction. The piston member 17 is connected to the housing 14 and the intake camshaft 1 by the engagements of the pairs of the helical gears 21a, 22a and 21b, 22b, and the teeth of the respective helical gears have predetermined helix angles. Therefore, when the piston member 17 slides in the axial direction, the positions of the engagements between the gears 21b and 22b, and between the gears 21a and 22a moves along the teeth of the respective gears in the axial direction. Since the teeth of the gears have helix angles, the positions of the engagements also move along the teeth of the gears in circumference direction. Consequently, when the piston moves in the axial direction, the housing 14 and the intake camshaft 1 rotate relatively to the piston member 17, thus the phase of the rotation of the intake camshaft 1 relative to the housing 14, i.e., the phase of the rotation of the intake camshaft relative to the timing pulley 12 changes in accordance with the sliding motion of the piston member 17. Since the timing pulley rotates synchronously with the crankshaft, this means that the phase of the rotation of the intake camshaft 1 relative to the crankshaft, i.e., the valve timing of the intake valves can be changed during the engine operation by sliding the piston member 17.

As understood from the above explanation, the valve timing adjusting mechanism 10 of the present embodiment only changes the phase of the rotation of the intake camshaft 1. The period of the opening of the intake valves are not changed since the opening timing and the closing timing of the intake valves are always changed by same amount.

In the valve timing adjusting mechanism 10 of the present embodiment, the valve timing of the intake valves are changed during the engine operation by moving the piston member 17 using hydraulic pressure. As shown in FIG. 1, two oil passages 2 and 3 are drilled through the intake camshaft 1 along the axis thereof. The oil passage 2 is disposed in the center of the intake camshaft 1. One end of the oil passage 2 communicates with a hydraulic chamber 5, which is defined by the housing and back side of the annular piston 19, through a port 2a drilled through the bolt 1a. The other end of the oil passage 2 is connected to a linear solenoid valve 25 through another port 2b drilled through the camshaft in radial direction.

On the other hand, one end of the oil passage 3 is closed by the ring-like outer helical gear 22b, but the oil passage 3 communicates to a hydraulic chamber 8, which is defined by the housing 14, the front side of the piston 19, and the back side of the timing pulley 12, through a radial port 3a drilled in the intake camshaft 1, and also connected to the linear solenoid valve 25 through another radial port 3b.

The linear solenoid valve 25 is a solenoid operated spool valve having a spool 26, and a hydraulic port 26a which is connected to the oil passage 2 via an oil pipe, another hydraulic port 26b which is connected to the oil passage 3 via another oil pipe, a hydraulic supply port 26c connected to an hydraulic fluid source 28 such as a lubricating oil pump of the engine, and a pair of drain ports 26d and 26e. The spool 26, the hydraulic ports 26a, 26b and the drain ports 26d and 26e are arranged in such a manner that when either of the ports 26a and 26b is connected to the hydraulic supply port 26c, the other of the ports 26a and 26b is connected to one of the drain port 26d and 26e by the spool 26.

Namely, when the spool 26 moves to the left in FIG. 1, the port 26a of the linear solenoid valve 25 which is connected to the port 2b of the oil passage 2 communicates with the hydraulic fluid source 28 through the port 26c, and the drain port 26d is closed by one of the lands of the spool 26. Further, the port 26b which is connected to the port 3b of the oil passage 3 communicates with the drain port 26e. Consequently, hydraulic fluid fed from the hydraulic fluid source flows into the hydraulic chamber 5 of the valve timing adjusting mechanism 10 through the oil passage 2 and the port 2a. The piston member 17 is urged to the right in FIG. 1 by the hydraulic pressure in the hydraulic chamber 5 which exerts a force on the back side of the annular piston 19. Therefore, the piston member 17 moves to the right in FIG. 1. By the displacement of the piston member 17, the hydraulic fluid in the hydraulic chamber 8 is drained from the chamber 8 through the port 3a, oil passage 3, port 3b, and the hydraulic port 26b and the drain port 26e of the linear solenoid valve 25.

On the contrary, when the spool 26 moves to the right in FIG. 1, the hydraulic port 26b is connected to the hydraulic fluid source 28 through the port 26c, and the port 26a communicates with the drain port 26d. Therefore, the hydraulic fluid from the hydraulic fluid source 28 flows into the hydraulic chamber 8 through the oil passage 3, and the fluid in the hydraulic chamber 5 is drained through the oil passage 2 and the drain port 26d of the linear solenoid valve 25. Consequently, the piston member 17 moves to the left in FIG. 1.

In this embodiment, the helix angles of the helical gears 21a, 21b and 22a, 22b are selected in such a manner that the valve timing of the intake valves retards when the piston member 17 moves to the left in FIG. 1, and advances when the piston member 17 moves to the right side in FIG. 1.

Numeral 25b in FIG. 1 is a linear solenoid actuator for driving the spool 26. The linear solenoid actuator 25 displaces the spool 26 by the amount directly proportional to the intensity of the control signal generated by a control circuit 30 explained later. Therefore, the position of the piston member 17, i.e., the valve timing of the intake valves is controlled by the signal from the control circuit 30.

The control circuit 30 in FIG. 1, which may consist of a microcomputer, further comprises a read-only-memory (ROM) 32 for storing a main routine and interrupt routines, a random-access-memory (RAM) 33 for storing temporary data, a central processing unit (CPU) 34, an input port 35, an output port 36, and a bi-directional bus 31 for connecting the CPU 34, the ROM 32, the RAM 33 and the input and output ports 35, 36 to each other. In this embodiment, the control circuit 30 performs a variable valve timing control for the engine by driving the linear solenoid actuator 25 so that the position of the spool 26 (i.e., the valve timing of the intake valves) is adjusted in accordance with the operating condition of the engine.

To perform the variable valve timing control, the signal from the air-flow meter 41 which corresponds to the amount of the inlet air mass flow G, and the signal from the temperature sensor 42 which corresponds to the engine coolant temperature THW, are fed to the input port 35 of the control circuit 30 via an AD converter 43. Further, a pulse signal corresponding to the crank angle CA is fed to the input port 35 from a crank angle sensor 45 disposed near the crankshaft. Also, a pulse signal corresponding to the cam angle CAM is fed to the input port 35 from a cam angle sensor 44 disposed on the distributor (not shown).

The pulse signal from the crank angle sensor 45 consists of two pulse signals, i.e., a N1 pulse signal generated every 720° of the crank angle, and a NE signal generated every 30° of the crank angle. The cam angle sensor 44 generates a CN1 pulse signal every 360° of the cam angle. The N1 signal from the crank angle sensor 45 is used as a reference signal for detecting the crank shaft position, and the NE signal is used by the control circuit 30 to calculate the engine speed from the interval between the pulses thereof. The CN1 signal of the cam angle sensor 44 is used as a reference signal for detecting the crankshaft position. The control circuit 30 calculates the engine speed NE (i.e., the rotating speed of the crankshaft) based on the pulse intervals of the NE signal, and calculates the difference in the phases of the rotation of the crankshaft and the intake camshaft (i.e., the valve timing of the intake valves) VT based on the engine speed NE and the interval between the N1 signal and the CN1 signal. The calculated valve timing VT is stored in the RAM 33 of the control circuit 30. The inlet air mass flow data G and the coolant temperature data THW are fetched by A/D conversion routine executed at a predetermined intervals, and then stored in the RAM 33 of the control circuit 30. Namely, the values of the engine speed data NE, the valve timing VT, inlet air mass flow G, and the coolant temperature data THW stored in the RAM 33 are updated at predetermined intervals.

The output port 36 of the control circuit 30 is connected to the actuator 25b of the linear solenoid valve 25 through a drive circuit 48 to supply a control signal to the actuator 25b.

Next, the setting of the valve timing of the present embodiment is explained with reference to FIG. 2.

Figure 2:
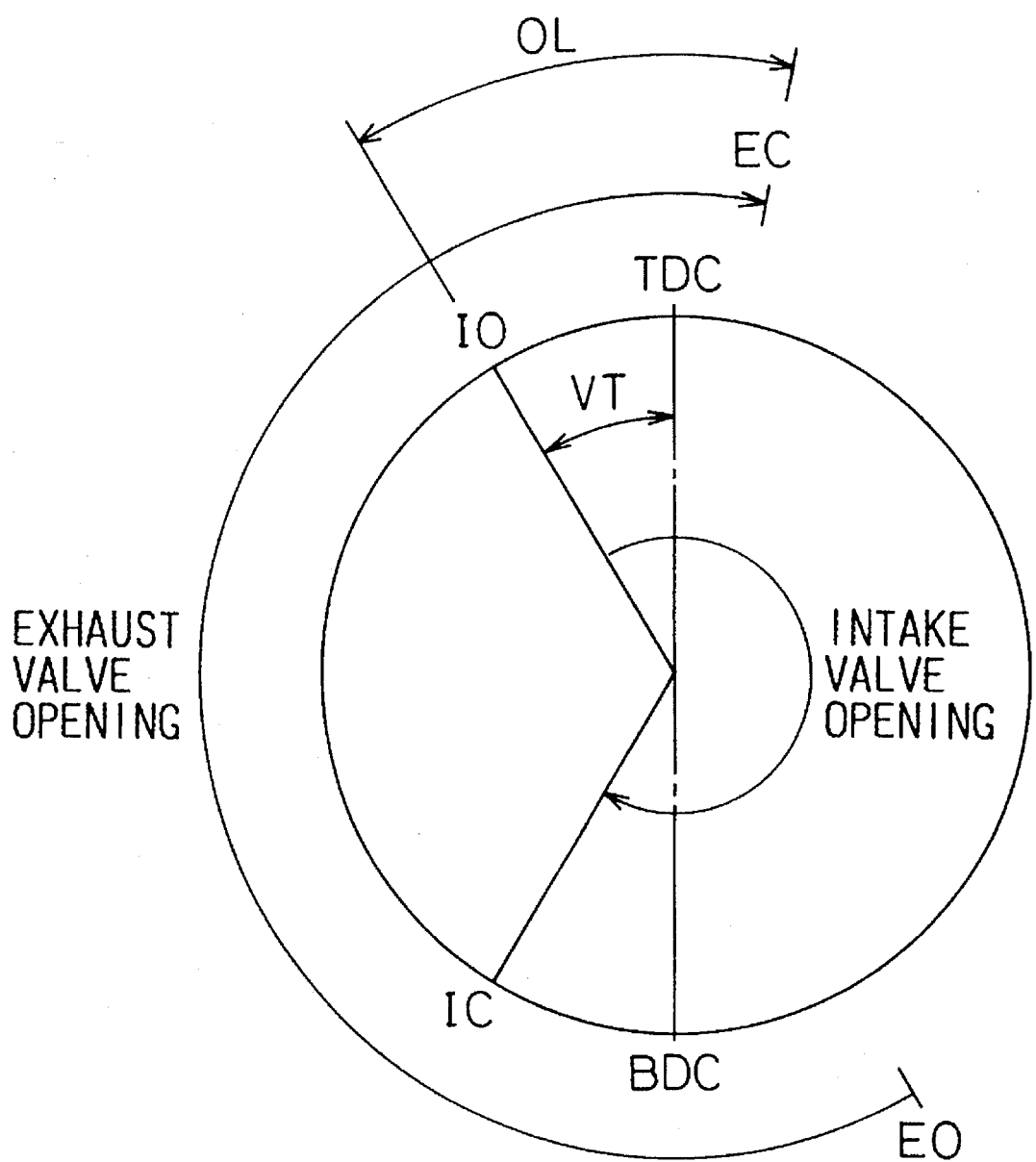
FIG. 2 is a timing chart schematically illustrating the general setting of the valve timings of the intake and the exhaust valves.

FIG. 2 schematically illustrates timings of opening and closing of the inlet valve and the exhaust valve of the respective cylinders. In FIG. 2, TDC designates a top dead center of a cylinder, BDC designates a bottom dead center, IO, IC indicate the opening timing and closing timing of the inlet valve, respectively. EO and EC indicate the opening timing and the closing timing of the exhaust valve, respectively. As shown in FIG. 2, the inlet valve opens before the TDC, in the exhaust stroke and closes after the BDC, in the compression stroke. The exhaust valve opens before the BDC, in the combustion stroke and closes after the TDC, in the suction stroke. Therefore, both the intake valve and the exhaust valve open during an overlap period (indicated by OL in FIG. 2) near the TDC in the exhaust period. In this specification, the valve timing VT of the intake valve is defined by the angle between the IO and the TDC in FIG. 2.

The valve timing VT of the intake valves effects the performance of the engine in the manner explained below.

(1) When the valve timing VT advances (i.e., when the angle VT in FIG. 2 increases), the overlap period of the intake valve and the exhaust valve becomes longer. When the engine is operated at low or medium load, this causes the amount of the residual burned gas in the cylinder to increase, since the amount of the burned gas flows backward from the exhaust port to the cylinder increases due to a relatively low intake manifold pressure. Therefore, when VT advances, so called internal EGR (exhaust gas re-circulation) effect increases during a low or medium load operation of the engine.

On the contrary, the internal EGR effect decreases even though VT advances when the engine is operated at high load, because the exhaust gas flown backward from the exhaust port decreases due to a high inlet manifold pressure in the high load operation of the engine.

(2) When the valve timing VT is retarded (i.e., when the angle VT in FIG. 2 decreases), the closing of the intake valve (IC in FIG. 2) is delayed. When the engine speed is low, this causes the actual compression ratio of the cylinder to decrease because, in the compression stroke, the amount of the inlet air in the cylinder which is expelled to the inlet port, before the intake valve closes, increases as the closing of the intake vale is delayed, i.e., the charging efficiency of the inlet air decreases as the valve timing is retarded when the engine speed is low.

On the contrary, when the engine speed is high, this causes the actual compression ratio of the cylinder to increase, i.e., the charging efficiency of the inlet air increases as the valve timing VT increases when the engine speed is high. This is because the velocity of the inlet air flow in the inlet air passage of the engine increases when the engine speed is high and the inertial charging effect of the inlet air flow becomes dominant.

In this embodiment, the opening timing and the closing timing of the intake valve changes by the same amount when the valve timing VT is changed, and the opening period of the intake valve is maintained at the same, as explained before. Therefore, the opening timing and the closing timing cannot be set independently.

Figure 3:
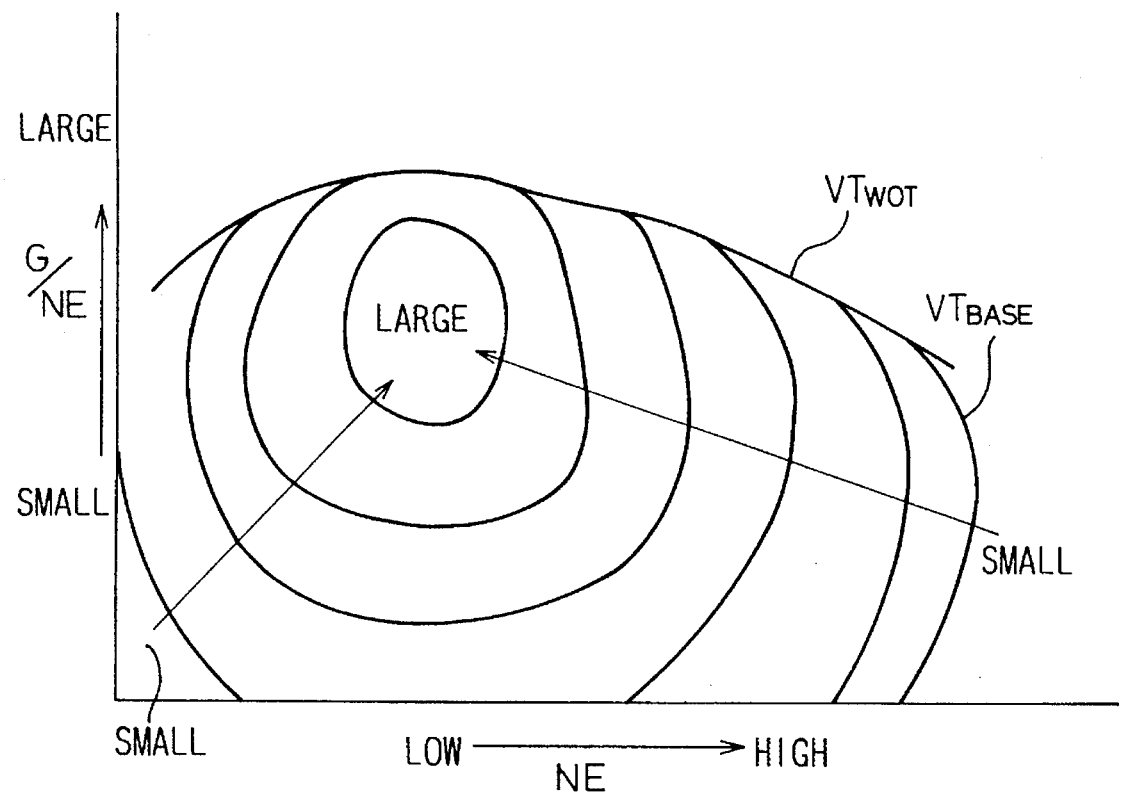
FIG. 3 shows an example of the relationships between the optimum valve timing setting and the operating condition of the engine.

Taking these conditions into consideration, a base valve timing $VT_{BASE}$, i.e., the most favorable valve timing corresponding to the respective operating conditions of the engine, is set as shown in FIG. 3 in this embodiment.

Referring to FIG. 3, the vertical axis of FIG. 3 indicates the engine load G/NE (the amount of the inlet air per one revolution of the engine), and the horizontal axis indicates the engine speed NE, and the curves in FIG. 3 show the base valve timings $VT_{BASE}$ for the respective operating conditions. The curve $VT_{WOT}$ in FIG. 3 shows the optimum valve timing for the full load operation. As seen from FIG. 3, the base valve timing $VT_{BASE}$ becomes maximum value (i.e., is most advanced) in a medium load and medium speed range, and becomes smaller (retards) as the distance from the medium load and medium speed range becomes larger.

The reason why the valve timing VT is generally set small in the low load operation range in FIG. 3 is to prevent combustion instability from occurring in the low load operation by decreasing the amount of residual burned gas fed by the internal EGR. Further, in the low load and low speed operation range, the valve timing VT is set to be smaller than in the low load and medium speed operation range, because the combustion instability easily occurs when the amount of the residual burned gas fed by the internal EGR is increased in this operation range. In the low load and high speed operation range, the valve timing is also smaller than in the low load and medium operation range to increase the engine output by increasing the charging efficiency of the inlet air using the inertial charging effect.

In the high load operation range, it is necessary to reduce the amount of the residual burned gas fed by the internal EGR to increase the engine output. Therefore, the valve timing VT is generally set to be small in the high load operation range. Especially, in the high load and high speed operation range, the inertial charging effect of the inlet air increases as the valve timing VT decreases. Therefore, the valve timing VT is set to be relatively small in the high load and high speed operation range.

In the medium load operation range, the valve timing VT is generally set to be large, since in this operation range, the $NO_x$ component in the exhaust gas, as well as the pumping loss of the engine can be reduced by increasing the residual burned gas fed by the internal EGR. Further, when the engine is operated at a medium load, the charging efficiency of the inlet air increases as the valve timing VT advances, since the amount of the inlet air expelled through the inlet port before the intake valve closes is decreased by advancing the valve timing VT. Therefore, it is preferable to advance the valve timing as much as possible in the medium load operation range. However, if the valve timing VT is advanced excessively in the low speed operation range, combustion instability occurs due to increase in the residual burned gas fed by the internal EGR. In the high speed operation range, the charging efficiency of the inlet air decreases as the valve timing VT advances, since the inertial charging effect of the inlet air decreases. Therefore, the amount of the valve timing advance is limited both in the medium load and low speed operation range and in the medium load and high speed operation range. On the other hand, such limitations do not exist in the medium load and medium speed operation range. Therefore, the valve timing VT takes the maximum value, i.e., the valve timing is most advanced in the medium load and medium speed operation range.

As explained above, if the engine speed is the same, the valve timing when the engine is operated at a medium load is larger than the valve timing when the engine is operated at higher load. Therefore, when the engine is accelerated from the medium load to the maximum load, the amount of the change (decrease) in the valve timing becomes larger. This means that the displacement of the piston member 17 of the valve timing adjusting mechanism 10 becomes large when the engine accelerates from a medium load to the full load, and the delay in changing the valve timing to the optimum timing for the full load operation occurs. The acceleration is worsened by this delay in the valve timing adjustment.

In this embodiment, the above problem is solved by setting the valve timing VT at the respective operating conditions in such a manner that the valve timing VT at each combination of the engine load and the engine speed falls within a predetermined range from the optimum valve timing in the full load operation $VT_{WOT}$ at that speed. In other word, if the engine speed is the same, the valve timing VT of the engine is always set within a predetermined range from the optimum valve timing $VT_{WOT}$, in this embodiment.

Figure 4:
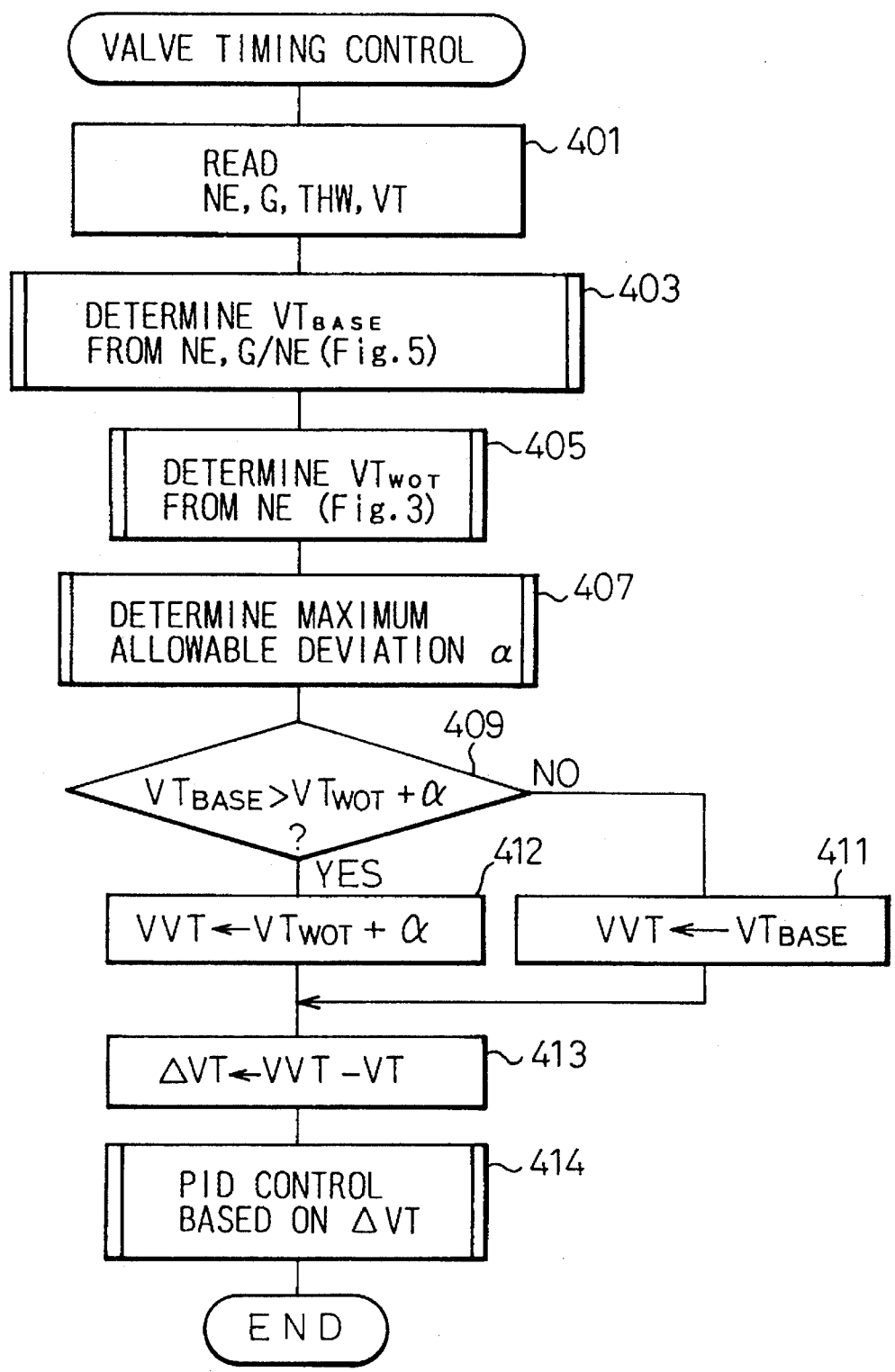
FIG. 4 is a flow chart illustrating an embodiment of the variable valve timing control according to the present invention.

The valve timing control of the present embodiment is now explained with reference to FIG. 4. FIG. 4 is a flow chart of the valve timing control routine which is executed by the control circuit 30 at predetermined intervals.

When the routine starts, at step 401 in FIG. 4, the latest values of the engine speed NE, the inlet air flow G, the present valve timing VT and the engine coolant temperature THW are read from the RAM 33 of the control circuit 30.

Figure 5:
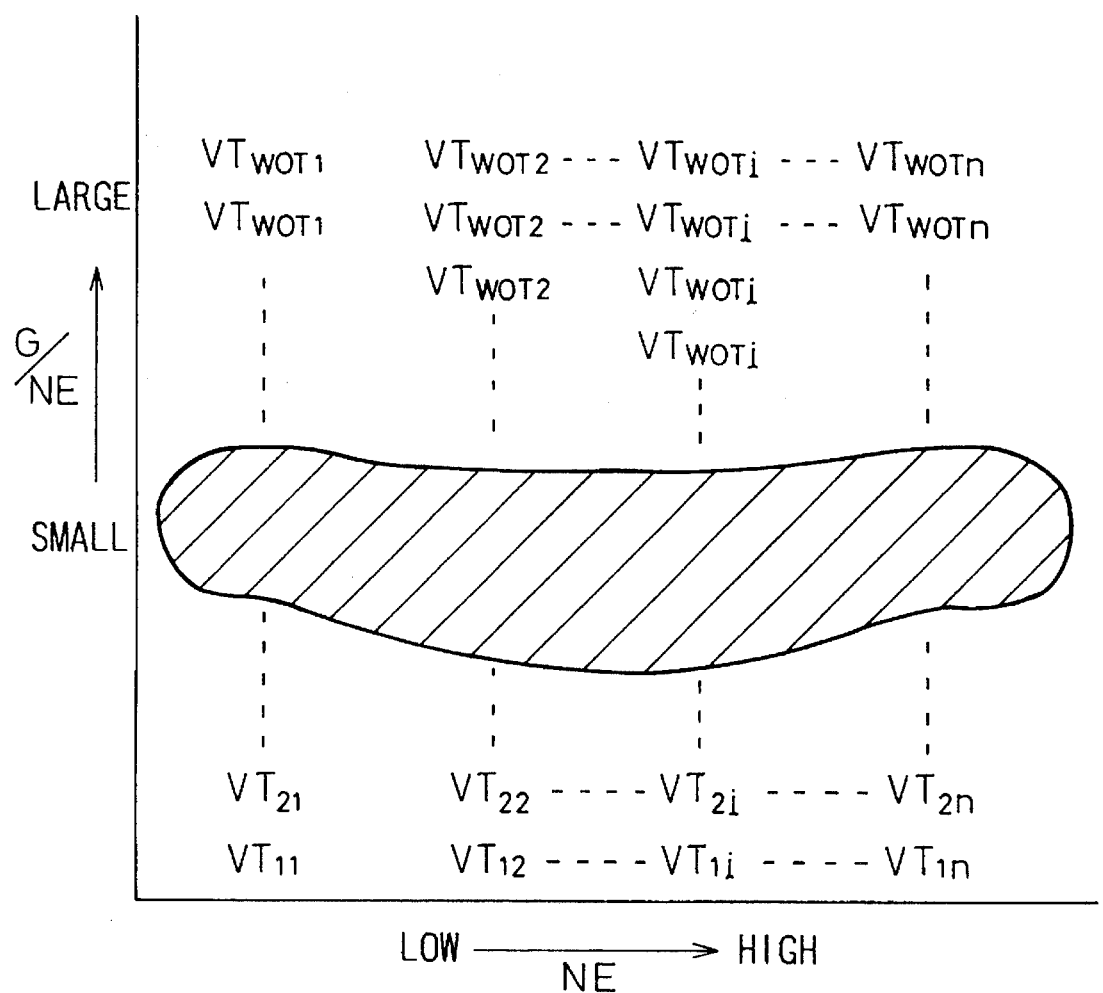
FIG. 5 shows an example of the setting of the valve timing used in the embodiment in FIG. 4.

Then, at step 403, the base valve timing $VT_{BASE}$ is determined in accordance with the calculated G/NE and NE. In this embodiment, the values of the base timing $VT_{BASE}$ shown in FIG. 3 are stored in the ROM 32 in the control circuit 30 in the form of a numerical table as shown in FIG. 5. In the actual operation, as the engine is operated at more than the full load in some cases, the valve timing in the engine operation at more than the full load is set at the same value as the full load operation in FIG. 5.

At step 405, the optimum valve timing $VT_{WOT}$ at the present engine speed NE is determined from the numerical table in FIG. 5 based on the present engine speed NE, and at step 407, the maximum allowable deviation α from $VT_{WOT}$ is determined. Determination of the maximum allowable deviation α is explained later, in detail.

At step 409, it is determined whether $VT_{BASE}$ determined at step 403 is within the maximum allowable deviation α from the optimum valve timing $VT_{WOT}$ at the full load operation. If the deviation of $VT_{BASE}$ from $VT_{WOT}$ is not larger than the maximum allowable value α, the target value of the valve timing VVT is set to $VT_{BASE}$ at step 411. On the other hand, if the deviation of $VT_{BASE}$ from $VT_{WOT}$ exceeds the maximum allowable value α, the routine proceeds to step 412, which sets the target valve timing VVT of the engine to the value ($VT_{WOT}+α$). After determining the target valve timing VVT at steps 411 or 412, the actual valve timing VT is adjusted to the target valve timing VVT at steps 413 and 414.

At step 413, the difference ΔVT between the target valve timing VVT and the present valve timing VT is calculated, and the linear solenoid valve 25 is controlled by the amount of the difference ΔVT at step 414. In this embodiment, the control circuit 30 controls the linear solenoid valve 25 by a PID control (proportional, integral and derivative control) based on the amount of the difference ΔVT.

As explained above, the valve timings VT for each operating condition are always set within the maximum allowable deviation α from the optimum valve timings of the full load operation at the same engine speed, i.e., the valve timing VT of the respective operating conditions is determined based on the optimum valve timing $VT_{WOT}$ at the same engine speed Therefore, according to the present embodiment, the amount of the operation of the valve timing adjusting mechanism 10 during the acceleration from any operating conditions does not exceed an amount corresponding to the maximum allowable deviation α. Consequently, by selecting the value of the maximum allowable deviation α appropriately, the time required for changing the valve timing to the optimum full load valve timing can be done in a short time without increasing the operation speed of the valve timing adjusting mechanism 10.

Figure 6:
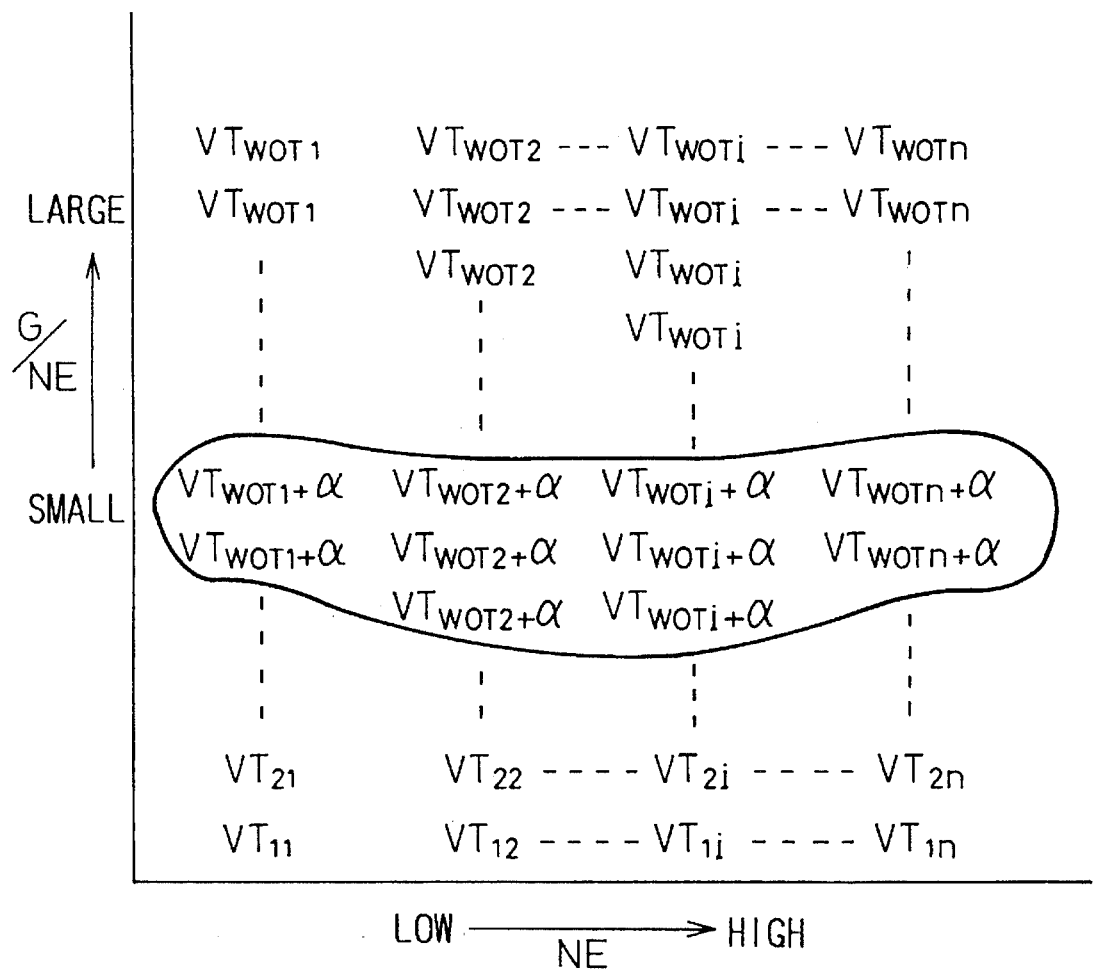
FIG. 6 shows another example of the setting of the valve timing.

Next, another embodiment of the valve timing control is explained with reference to FIGS. 6 and 7. In the embodiment in FIG. 4, the target valve timing VVT is determined by determining the base valve timing $VT_{BASE}$ in accordance with the operating condition of the engine first, then correcting $VT_{BASE}$ if the deviation of $VT_{BASE}$ from $VT_{WOT}$ exceeds the maximum allowable deviation α. In this embodiment, the target valve timing VVT is directly determined from the numerical table shown in FIG. 6. The numerical table in FIG. 6 is generally the same as the numerical table in FIG. 5. However, the values of $VT_{BASE}$ in the operation range indicated by hatched area in FIG. 5 are replaced with the value ($VT_{WOT}+\alpha$) in FIG. 6. Since the values of $VT_{BASE}$ in the hatched area in FIG. 5 exceed the value ($VT_{WOT}+\alpha$), these values have been replaced with the value ($VT_{WOT}+\alpha$) in FIG. 6. Namely, in this embodiment, the operations from steps 405 through 412 are performed when preparing the numerical table in FIG. 6. Therefore, instead of processing steps 405 to 412, the target value VVT is directly determined from the numerical table in FIG. 6 based on the present engine load G/NE, and the present engine speed NE, in this embodiment.

Figure 7:
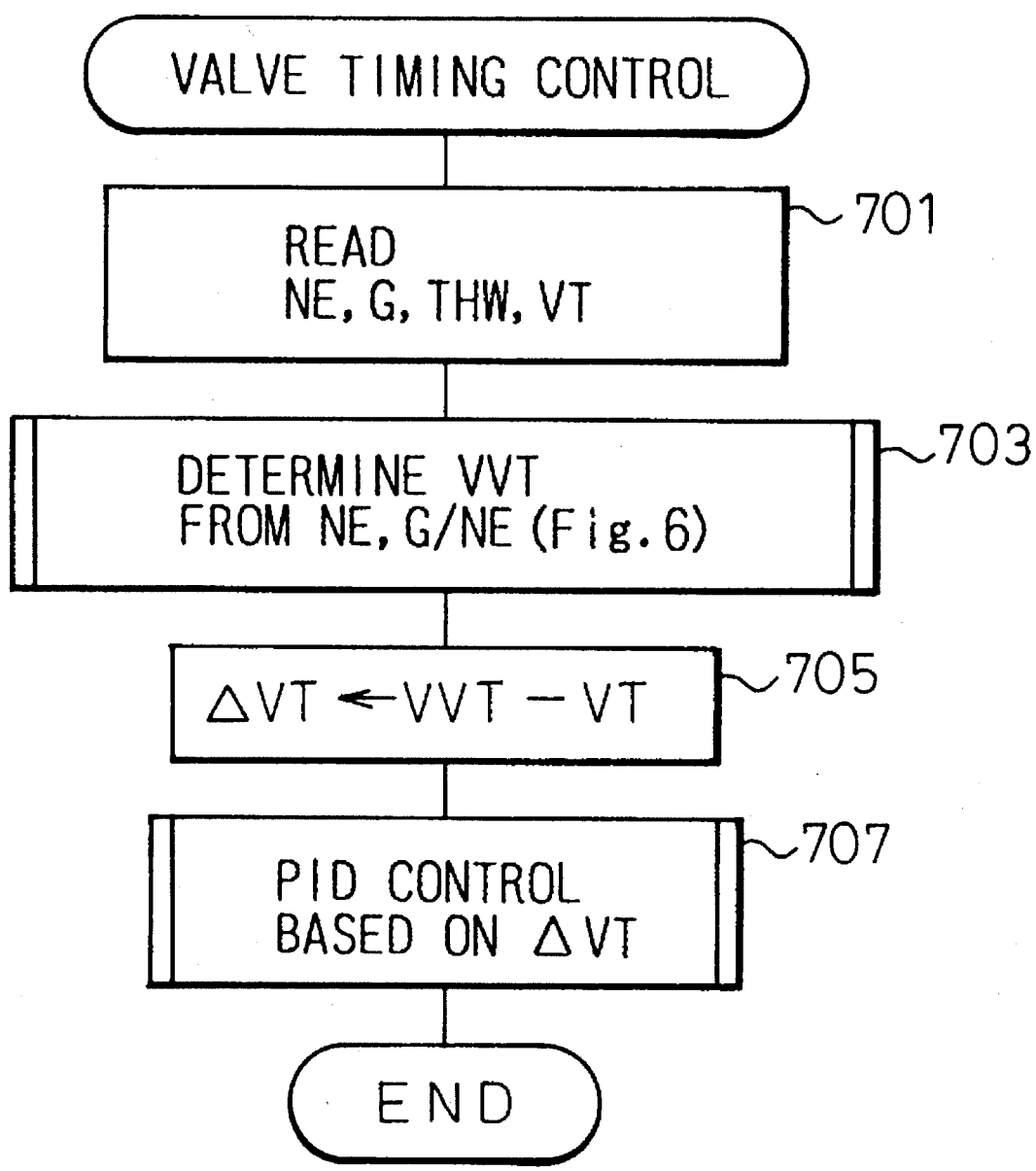
FIG. 7 is a flow chart illustrating another embodiment of the variable valve timing control according to the present invention; and, FIG. 8 and FIG. 9 show the examples of the setting of the maximum allowable deviation α used for determining the valve timing.

FIG. 7 shows a flow chart of the valve timing control routine of the present embodiment. This routine is processed by the control circuit 30 at predetermined intervals. In FIG. 7, the values of the engine speed NE, the inlet air flow G, the present valve timing VT and the engine coolant temperature THW are read from the RAM 33 of the control circuit 30 at step 701, then, the target valve timing VVT is directly determined at step 703 based on the numerical table in FIG. 6. The linear solenoid valve 25 is then controlled in steps 705 and 707 which are the same as steps 413 and 414 in FIG. 4. As seen from FIG. 7, the control processes of the control circuit 30 are largely simplified according to the present embodiment.

Next, methods for determining the maximum allowable deviations $\alpha$ in the above embodiments is explained. The value of $\alpha$ is determined in accordance with the maximum operating speed of the valve timing adjusting mechanism 10 so that the acceleration of the vehicle is not reduced by the delay in the valve timing adjustment. Therefore, it is preferable to determine the value $\alpha$ suitable to each operating condition, for example, by experiment, using the actual engine and valve timing adjusting mechanism. The value $\alpha$ may be a constant for all the operating condition, i.e., the smallest value determined by the experiment may be used for all the operating conditions. However, if the value $\alpha$ is small, the difference between the optimum valve timing ($VT_{BASE}$) and the actual valve timing becomes large during the medium load operation of the engine, and the advantages of a variable valve timing control is not obtained. Therefore, in the above embodiments, the value of the maximum allowable deviation $\alpha$ is changed in accordance with the operating condition of the engine.

Figure 8:
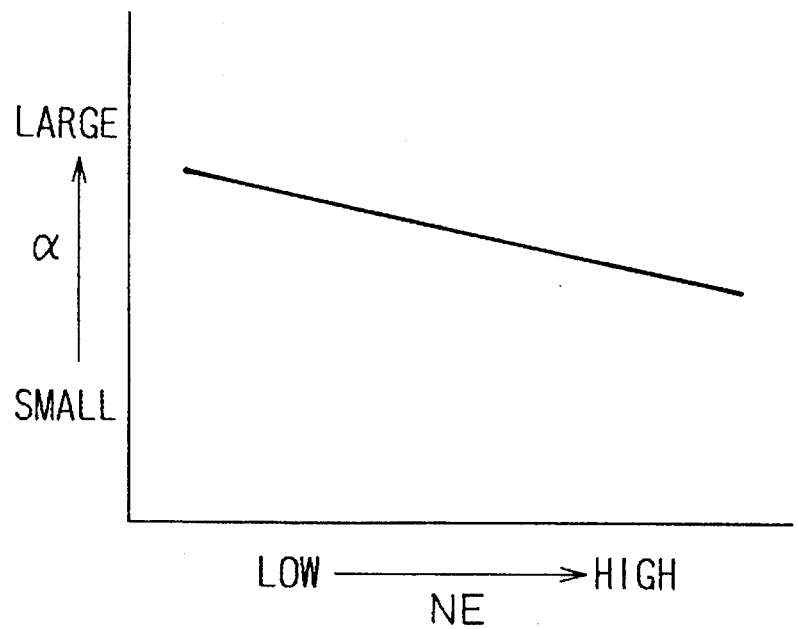

FIG. 8 shows an example of setting the value $\alpha$, in which $\alpha$ is determined in accordance with the engine speed NE. As shown in FIG. 8, the value of the maximum allowable deviation $\alpha$ decreases almost linearly as the engine speed NE increases.

In order to increase the engine output during acceleration, it is necessary to advance the ignition timing of the engine as the actual compression ratio of the engine increases. However, if the ignition timing is advanced beyond a certain limit, knock occurs. Therefore, the ignition timing cannot be advanced beyond the knock limit. The knock limit of the ignition timing becomes smaller as the engine speed decreases. Therefore, when the engine is accelerated from low engine speed, the ignition timing cannot be advanced by a large amount because of the low knock limit of the ignition timing during low speed operation of the engine. This means that even though the valve timing is adjusted to the optimum value for the full load operation and the actual compression ratio of the engine increases in short time, the ignition timing cannot be advanced to the timing suitable for the actual compression ratio of the engine due to the existence of the knock limit. In other words, when the engine speed is low, the acceleration of the engine is determined by the knock limit of the ignition timing, and the acceleration of the engine is not improved even though the valve timing is adjusted quickly. Therefore, it is less important to set the value $\alpha$ to a small value, in order to adjust the valve timing, in a short time during the engine low speed operation.

On the contrary, when the engine speed is high, the knock limit becomes large. In this case, the acceleration of the engine is determined by the response of the valve timing adjustment, since the ignition timing can be advanced by a large amount. Therefore, it is necessary to adjust the valve timing as fast as possible during acceleration in a high-speed engine operation.

In this embodiment, as shown in FIG. 8, the maximum allowable deviation $\alpha$ is set larger when the engine speed is low so that the valve timing in the medium load operation of the engine can be set at near the optimum valve timing. On the other hand, when the engine speed is high, the maximum allowable deviation $\alpha$ is smaller in order to improve the acceleration of the engine by shortening the time for valve timing adjustment.

In the embodiment in FIG. 4, the relationship between $\alpha$ and NE in FIG. 8 is stored in the ROM 32 in the control circuit 30, and the maximum allowable deviation $\alpha$ is determined from FIG. 8 in accordance with the engine speed NE. As explained above, according to the embodiment in FIG. 8, the acceleration of the engine can be improved while maintaining the performance in the low and medium engine speed range.

Figure 9:
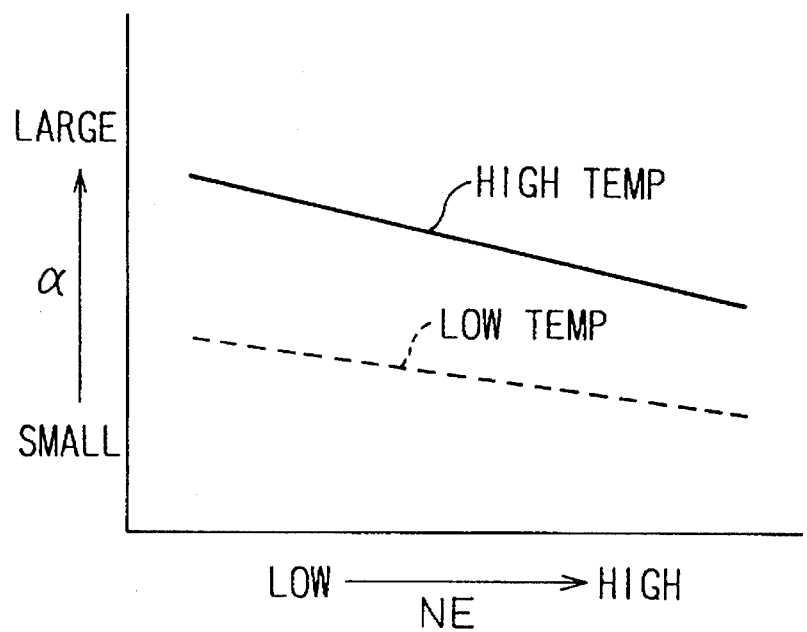

FIG. 9 shows another embodiment of the method for determining the value of the maximum allowable deviation $\alpha$ in FIG. 4 and 7. In this embodiment, the value of $\alpha$ is also determined in accordance with the engine speed NE. However, in this embodiment, the value of $\alpha$ is set smaller as the engine temperature becomes lower even though the engine speed is the same.

When the temperature of the engine is low, the viscosity of the lubricating oil (i.e., hydraulic fluid of the valve timing adjusting mechanism 10 in FIG. 1) is high. Therefore, the operating speed of the valve timing adjusting mechanism 10 becomes low due to the higher viscosity of the hydraulic fluid when the temperature of the engine is low. In this embodiment, since the maximum allowable deviation $\alpha$ is set smaller at a low engine temperature, the amount of the operation of the valve timing adjusting mechanism 10 becomes accordingly smaller. Therefore, the time required for adjusting the valve timing to the optimum value for the full load operation is kept substantially the same even though the operating speed of the valve timing adjusting mechanism 10 decreases.

Further, when the maximum allowable deviation $\alpha$ is small, the amount of the internal EGR becomes smaller during the low and medium load operation of the engine. Therefore, the combustion instability of the engine at a low engine temperature can be reduced by setting the maximum allowable deviation $\alpha$ at smaller values when the engine temperature is low.

In FIG. 9, the solid line shows the setting of $\alpha$ when the temperature of the engine is high, and the dotted line shows the same when the temperature of the engine is low. In the embodiment in FIG. 4, when the temperature of the engine coolant THW read at step 401 is higher than a predetermined value (for example, 70° C.), the value of $\alpha$ is determined based on the solid line in FIG. 9 at step 407 in FIG. 4, and when THW is lower than the predetermined value, the value of $\alpha$ is determined based on the dotted line in FIG. 9 at step 407 in FIG. 4. According to the embodiment in FIG. 9, the response of the valve timing adjusting mechanism 10 is not affected by the engine temperature, and an improved acceleration can be obtained even when the engine temperature is low.

Though the present invention has been described with reference to specific embodiments chosen for the purpose of illustration, it should be understood that numerous modification could be applied by those skilled in the art without departing from the basic concept and scope of the present invention. For example, a valve timing adjusting mechanism other than the type explained in the embodiments can also used in the present invention. Further, the present invention can be applied to a variable valve timing control device which controls both the intake and exhaust valve timings.

We claim:

1. A variable valve timing control device, for an engine, for controlling the valve timing of the engine, in accordance with an operating condition thereof, comprising:

an engine speed detecting means for detecting the rotating speed of the engine;

an engine load detecting means for detecting the load on the engine;

an optimum-full-load valve-timing calculating means for calculating the optimum valve timing of the engine when the engine is operated at a full load with the engine speed detected by said engine speed detecting means;

a valve timing setting means for determining a setting value of the valve timing of the engine based on the engine speed detected by said engine speed detecting means and the engine load detected by said engine load detecting means, in such a manner that an amount of the deviation of said setting value of the valve timing from said optimum full load valve timing does not exceed a predetermined limiting value; and, a valve timing adjusting means for adjusting the valve timing of the engine to said setting value determined by said valve timing setting means.

2. A variable valve timing control device according to claim 1, wherein said predetermined limiting value is determined in accordance with the maximum operating speed of said valve timing adjusting means for changing the valve timing of the engine.

3. A variable valve timing control device according to claim 1, wherein said predetermined limiting value is set in such a manner that said limiting value decreases as the engine speed increases.

4. A variable valve timing control device according to claim 1, wherein said predetermined limiting value is set in such a manner that said limiting value is set at smaller value when a temperature of the engine is low, and at larger value when the temperature of the engine is high.

5. A variable valve timing control device for an engine for controlling the valve timing of the engine in accordance with an operating condition thereof comprising:

an engine speed detecting means for detecting the rotating speed of the engine;

an engine load detecting means for detecting the load on the engine;

an optimum-full-load valve-timing calculating means for calculating an optimum valve timing of the engine when the engine is operated at a full load with the engine speed detected by said engine speed detecting means;

a valve timing setting means for determining a setting value of the valve timing of the engine based on the present engine speed detected by said engine speed detecting means and the present engine load detected by said engine load detecting means in such a manner that said setting value becomes an optimum valve timing decided by the present engine speed and the present engine load;

a correcting means for correcting said setting value of the valve timing in such a manner that an amount of the deviation of said setting value of the valve timing from said optimum full load valve timing does not exceed a predetermined limiting value when said amount of the deviation becomes larger than said predetermined limiting value; and, a valve timing adjusting means for adjusting the valve timing of the engine to said setting value after it is corrected by said correcting means.

6. A variable valve timing control device according to claim 5, wherein said optimum valve timing determined by said valve timing setting means deviates from said optimum full load valve timing by an amount larger than said limiting value when the engine is operated at a medium load range.

7. A variable valve timing control device according to claim 5, wherein said predetermined limiting value is determined in accordance with the maximum operating speed of said valve timing adjusting means for changing the valve timing of the engine.

8. A variable valve timing control device according to claim 5, wherein said predetermined limiting value is set in such a manner that said limiting value decreases as the engine speed increases.

9. A variable valve timing control device according to claim 5, wherein said predetermined limiting value is set in such a manner that said limiting value is set at smaller value when the temperature of the engine is low, and at larger value when the temperature of the engine is high.

* * * * *

UNITED STATES PATENT AND TRADEMARK OFFICE
CERTIFICATE OF CORRECTION

PATENT NO. : 5,469,818
DATED : November 28, 1995
INVENTOR(S) : Mamoru YOSHIOKA et al.

It is certified that error appears in the above-indentified patent and that said Letters Patent is hereby corrected as shown below:

| Column | Line | |
|--------|------|---|
| 6 | 38 | Change "On the contrary" to --On the other hand--. |
| 7 | 38 | After "at" delete "a". |
| 7 | 67 | Change "effects" to --affects--. |
| 8 | 7 | Change "flows" to --flowing--. |
| 8 | 13 | Change "On the contrary" to --On the other hand--. |
| 8 | 25 | Change "vale" to --valve--. |
| 8 | 28 | Change "On the contrary" to --On the other hand--. |
| 9 | 59 | Change "word" to --words--. |

Signed and Sealed this

Fourteenth Day of May, 1996

Attest:

BRUCE LEHMAN

*Attesting Officer*     *Commissioner of Patents and Trademarks*